Aug. 8, 1939.   J. R. GAMMETER   2,169,041
PNEUMATIC TIRE
Filed Feb. 3, 1936   3 Sheets-Sheet 2
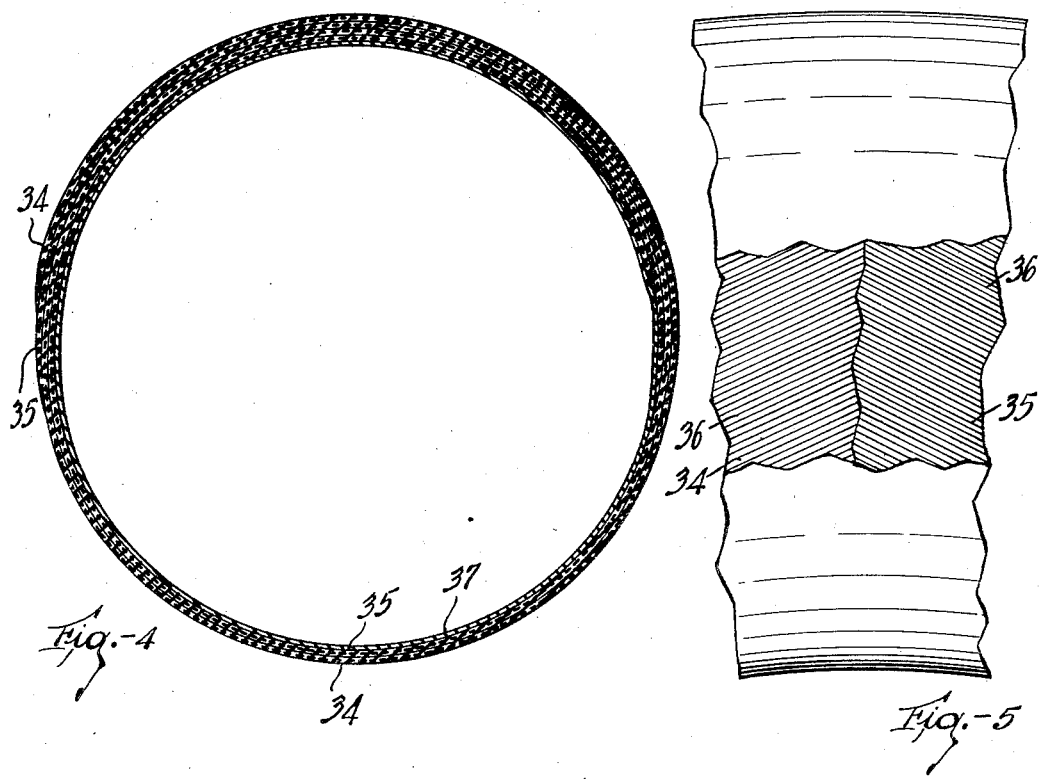
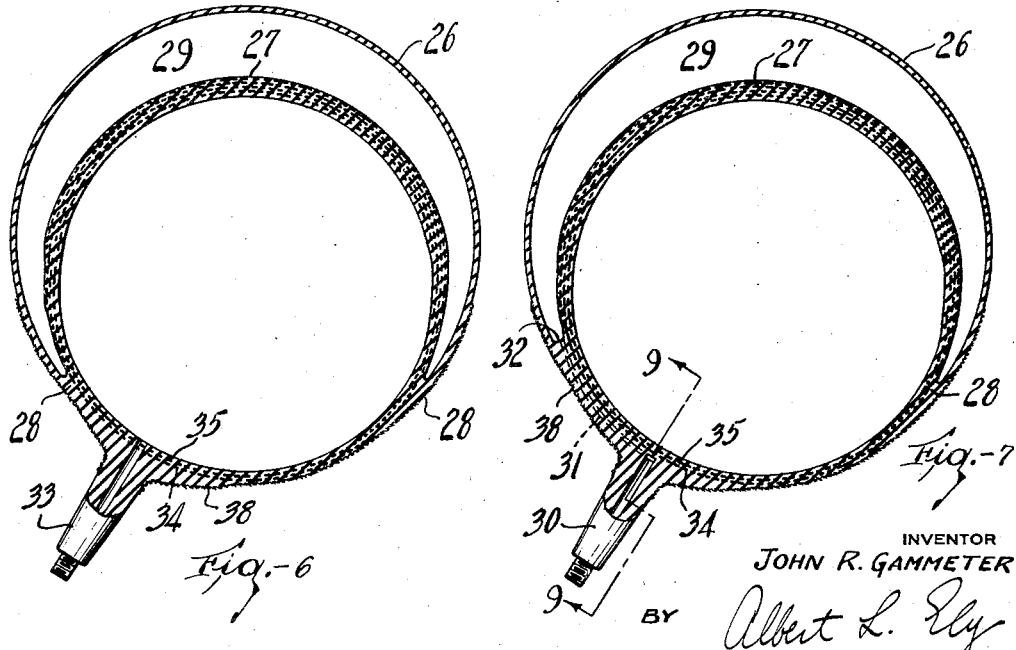
INVENTOR
JOHN R. GAMMETER
BY Albert L. Ely
ATTORNEY

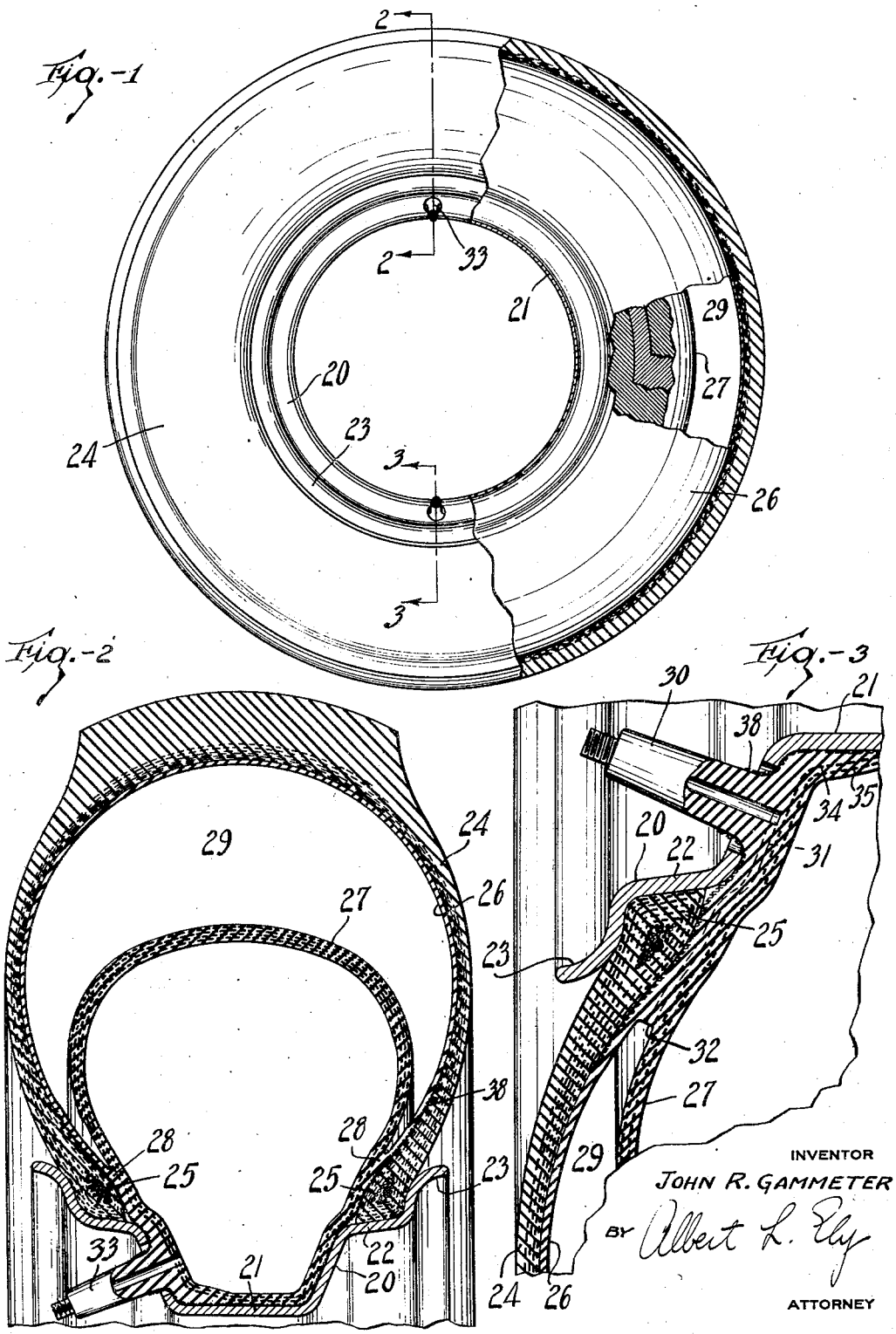

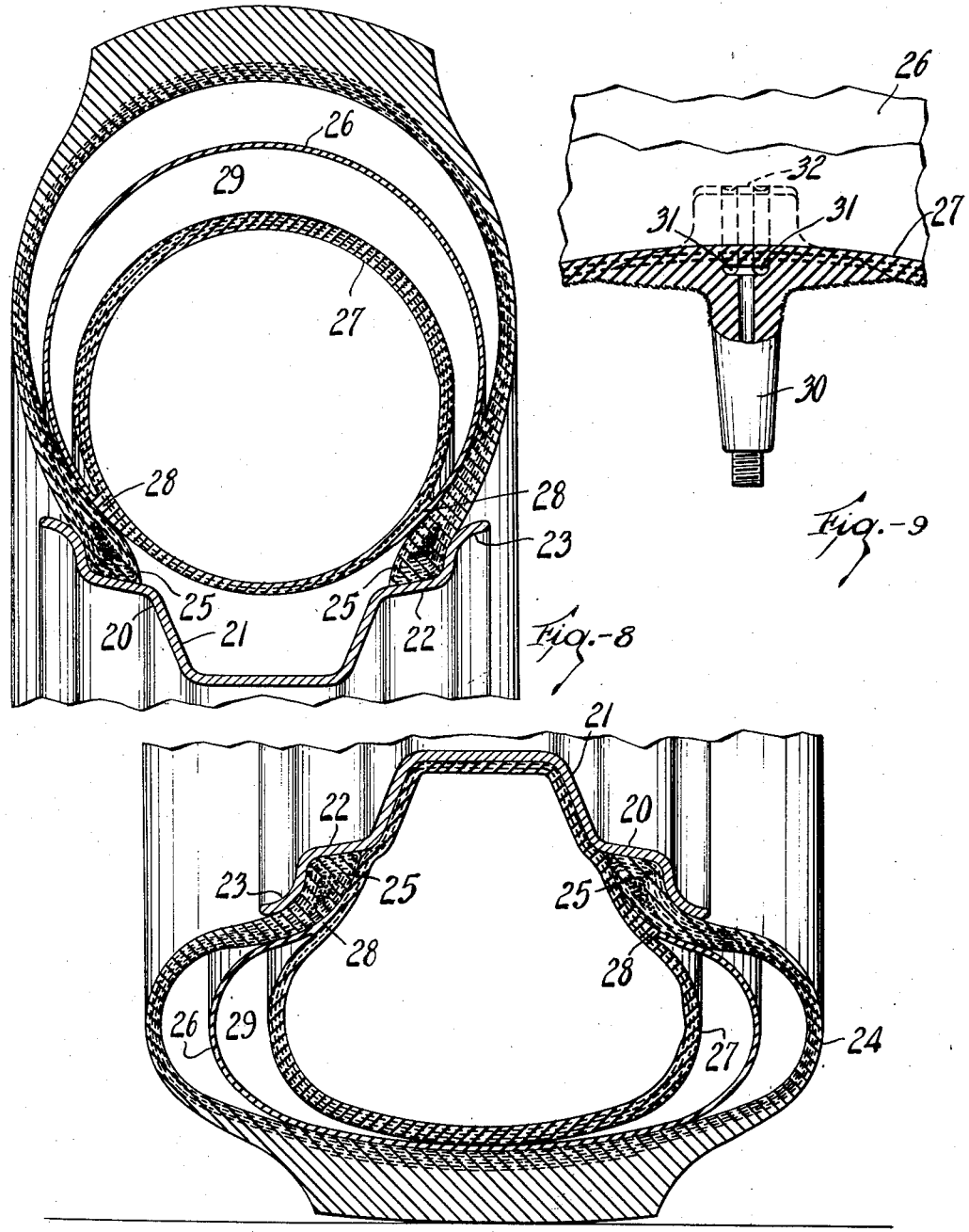

Patented Aug. 8, 1939

2,169,041

UNITED STATES PATENT OFFICE 2,169,041

PNEUMATIC TIRE

John R. Gammeter, Akron, Ohio, assignor to United States Rubber Company, New York, N. Y., a corporation of New Jersey Application February 3, 1936, Serial No. 62,090

5 Claims. (Cl. 152—340)

This invention relates to improvements in pneumatic tires for motor vehicles and the like, and has for its primary object to provide an auxiliary inner tube capable of indefinitely supporting the vehicle in the event the regular inner tube should become damaged due to puncture, blowout or similar cause.

A further object of the invention is to provide an auxiliary inner tube which is capable of co-operating with the casing in a manner to maintain the latter on its associated rim independently of the regular inner tube.

A still further object of the invention is to provide an auxiliary inner tube of multi-ply rubber and thread fabric construction in which the threads are normally wound spirally in diagonally opposite directions at a long angle, so that upon inflation it contracts in circumference and expands in cross-section, tending to maintain the beads of the tire in spaced relation on the rim independently of the condition of the regular inner tube.

With the objects above indicated and other objects hereinafter explained in view, the invention consists in the construction and combination of elements hereinafter described and claimed.

Referring to the drawings,

Figure 1 is a front elevational view of a tire and rim assembly with portions of the tire broken away to more clearly illustrate the invention;

Figure 2 is a transverse sectional view taken on line 2—2 in Figure 1 and on an enlarged scale;

Figure 3 is a fragmentary transverse sectional view taken on line 3—3 in Figure 1 and on a still larger scale;

Figure 4 is a transverse sectional view of the auxiliary inner tube showing the ply arrangement;

Figure 5 is a side elevational view of that shown in Figure 4 with a portion broken away to more clearly show the spiral winding of the cords or threads on a long angle;

Figure 6 is a transverse sectional view showing the arrangement of the regular inner tube with respect to the auxiliary inner tube adjacent one valve stem;

Figure 7 is a view similar to Figure 6 but taken adjacent the other valve stem;

Figure 8 is a transverse sectional view showing the relationship of a rim, casing, regular and auxiliary inner tubes before inflation;

Figure 9 is a sectional view taken on line 9—9 in Figure 7;

Figure 10 is a transverse sectional view of a rim, casing and tube assembly showing the manner in which the auxiliary inner tube supports the vehicle after failure of the regular inner tube.

In the drawings, a rim 20 of the drop center type is shown which has a circumferential well 21, oppositely extending lateral flanges 22 and bead ring flanges 23, all integrally united in a manner well known in the art. Also while the features of the invention are particularly directed to rims of this type, their adaptations are not limited thereto as any type of rim may be used with improved results.

A tire casing 24 of the usual construction has beads 25 which normally engage the flanges 22 on the rim 20 and are prevented from relative separation by the bead ring flanges 23, as more clearly shown in Figures 2 and 3. The casing 24 is removable from the rim 20 in the usual manner by pressing the beads 25 inwardly until the upper portion drops into the well 21, thereby causing the lower portion to move clear of the bead flanges 23, in which case the lower portion of the casing may be pulled outwardly beyond the rim and then the upper portion removed. When a tire becomes flat from puncture or blowout, the casing in many instances is forced off the rim due to the fact that the beads 25 are forced by the load into the well 21 and endangers the life of the driver because the vehicle will be out of control and even though it may be controlled, the casing and tube are ordinarily ruined by having run them in deflated condition. Various types of tubes have been devised in an attempt to overcome these serious conditions, but none have been entirely satisfactory or efficient.

The particular feature of the present invention which makes this tire an improvement over the present types available and practically eliminates these dangers is the provision of an auxiliary inner tube capable of supporting the load of the vehicle indefinitely and independently of the regular inner tube and which when inflated contracts circumferentially and expands in cross-section cooperating with the beads of the casing to maintain them in spaced relation on the rim. This may be effected in various ways, but preferably in the manner shown in the accompanying drawings.

A regular inner tube 26 is provided and is insertable within the casing 24 in the usual manner and when inflated to the desired pressure, say 20 to 30 pounds, is adapted to support its proportionate share of the load of the vehicle. An auxiliary inner tube 27 of multi-ply fabric and rubber construction is provided in the form of an endless air-tight tube of normally circular cross-section as shown in Figure 8. The lower portion of the regular inner tube 26 is preferably connected to the adjacent portions of the auxiliary inner tube 27 as indicated at 28 to produce an integral or at least an air-tight connection with an air chamber 29 therebetween. A valve stem 30 is provided on the outside of the auxiliary inner tube 27 and is adapted to project through an opening in one of the side walls of the well 21 as more clearly shown in Figure 3. A pair of spaced passageways 31 extend laterally from the passageway in the valve stem 30 into communication with the interior of the chamber 29 at a point 32, preferably the junction between the regular and auxiliary inner tubes and affords a means by which the regular inner tube may be inflated independently of the auxiliary inner tube 27. If there should be any tendency toward closing of the passageways 31 under pressure, any suitable means (not shown) may be utilized to keep the passageways open.

A valve stem 33 is connected to the outside of the auxiliary inner tube 27 and is adapted to project through an opening in the same side wall of the well 21 but at a diametrically opposite point as more clearly shown in Figures 1 and 2. This relative positioning of the valve stems is, however, of little importance and preferably the valve stems should be of different colors to distinguish one from the other. This valve stem 33 has a passageway which communicates with the interior of the auxiliary inner tube 27 and affords a means by which the latter may be independently inflated to the desired pressure, say 30 pounds. It should be particularly noted that there is no connection for the passage of air between the regular and auxiliary inner tubes.

When the auxiliary inner tube 27 is inflated to the desired pressure, it contracts circumferentially and expands in cross-section due to the particular manner in which it is constructed and which will be more fully described hereinafter. In contracting the inner peripheral portion of the auxiliary inner tube 27 extends between the beads 25 of the casing and into contact with the inner surface of the well 21, as more clearly shown in Figure 2, with the result that as long as the tube remains inflated the beads 25 are maintained in spaced relation upon the rim surfaces 22 and thereby prevented from being forced into the well 21 which might cause the casing to become disengaged from the rim.

In the event the regular inner tube 26 should become punctured or otherwise injured in such a manner as to release the air pressure therein, the casing 24 would become distorted to the extent substantially as shown in Figure 10, but would not be injured or become disengaged from its rim by reason of the air pressure in the auxiliary inner tube 27 and its cooperation with the beads 25 of the casing, although the pressure in the auxiliary inner tube 27 may become less, say 25 pounds, due to the expansion of the tube because of the applied load of the vehicle.

Auxiliary inner tubes having the hereinbefore-described properties may be produced in various manners, but I have shown herein a preferred construction. Referring particularly to Figures 4 to 7, inclusive, I propose to employ two plies of rubberized fabric 34 and 35, the threads 36 of which extend diagonally in relatively opposite directions as more clearly shown in Figure 5. These threads 36 are positioned on a long angle preferably between 60 and 70 degrees when in their normal condition. The plies 34 and 35 may be applied about a drum in a manner similar to flat band building of casings, with their peripheral edges offset laterally relatively. A thin sheet of rubber may also be applied to the outer surface to provide an air-tight inner coating 37 on the finished tube. The opposite edges of the plies 34 and 35 are moved outwardly and inwardly in overlapping position which produces a four-ply construction on the outer portion of the tube as more clearly shown in Figure 4.

The tube structure is then removed from the drum and partially vulcanized in a mold in the usual manner. Next the regular inner tube 26 is formed from a layer of rubber which is formed to substantially U-shape and the spaced marginal portions are stitched to the partly cured auxiliary inner tube along the line indicated by 28. The entire structure is then completely vulcanized in the usual manner, care being taken to maintain a differential air pressure within the respective tubes during vulcanization. The auxiliary inner tube should be partly vulcanized to an extent wherein complete vulcanization can be effected during the period required to effect vulcanization of the regular inner tube. The valve stems, of course, are secured to the auxiliary tube before vulcanization in the usual manner and strips 38 of stockinette material is placed in contact with the casing when the tube is inserted therein and permits the escape of any air which might be trapped between the casing and inner tube.

When the dual tube is inserted within the casing, it normally assumes the position shown in Figure 8. The inside diameter of the auxiliary tube is considerably larger than the outside diameter of the rim and consequently the former is mountable upon and removable from the latter without interference or distortion. The threads of the fabric remain in the same angular relationship as heretofore stated, approximately 60° to 70°. When the auxiliary tube is inflated, it increases in cross-section and contracts circumferentially until the threads have assumed an angle of approximately 45°, as shown in Figure 1. This produces a construction which will adequately support the load in the event of a puncture or blowout in the regular inner tube, and at the same time maintains the beads of the casing in spaced relation to prevent removal from the rim so long as the air pressure is maintained therein.

While I have described the preferred embodiment of the invention, it should be understood that I am not to be limited thereto inasmuch as changes and modifications may be resorted to without departing from the spirit of the invention as defined in the appended claims.

What is claimed is:

1. An inner tube for pneumatic tires comprising a regular inflatable rubber tube adapted to be disposed within a casing, means by which said regular tube may be inflated, an auxiliary inflatable multi-ply rubber and fabric tube having a portion disposed within said regular tube and connected to the latter, the threads of the fabric extending spirally normally at a long angle completely around the tube in diagonally opposite directions in the different plies, and means by which said auxiliary tube may be inflated independently of said regular tube.

2. An inner tube for pneumatic tires comprising a regular inflatable rubber tube adapted to be disposed within a casing, means by which said regular tube may be inflated, an auxiliary inflatable multi-ply rubber and fabric tube having a portion disposed within said regular tube and connected to the latter, the threads of the fabric extending spirally at a normal angle between 60 and 70 degrees completely around the tube, and means by which said auxiliary tube may be inflated independently of said regular tube.

3. An inner tube for pneumatic tires comprising an inflatable tube adapted to be disposed within a casing, an auxiliary inflatable tube formed of at least two plies of rubberized fabric disposed within said first-named tube, with the outer portions of said tubes being spaced apart and the inner portions thereof being connected in a common base, the cords of fabric being oppositely disposed in each ply and extending before inflation at an angle of between 60° and 70° completely around the auxiliary tube, said cords extending after inflation at an angle of about 45°, and means for inflating the tubes.

4. An inner tube constructed in accordance with claim 3 wherein said auxiliary tube is provided with an integral rubber lining.

5. An inner tube for pneumatic tires comprising an inflatable tube adapted to be disposed within a casing, an auxiliary inflatable tube disposed within said first named tube with the outer portions of said tubes being spaced apart and the inner portions thereof being connected in a common base, said auxiliary tube being formed of a plurality of plies of rubberized fabric extending completely around the tube, the outer portion of said auxiliary tube being formed with a greater number of plies than the inner portion, the cords of said fabric being oppositely disposed in each ply and extending before inflation at an angle between 60° and 70° completely around the auxiliary tube, said cords after inflation extending at an angle of about 45° and means for inflating said tubes.

JOHN R. GAMMETER.